United States Patent
Colley et al.

(10) Patent No.: US 9,956,523 B2
(45) Date of Patent: May 1, 2018

(54) METHOD FOR CONVERTING LIME-BASED WET FLUE GAS DESULFURIZATION SYSTEMS TO LIMESTONE-BASED SYSTEMS

(71) Applicant: AECOM Technical Services, Inc., Austin, TX (US)

(72) Inventors: James David Colley, Austin, TX (US); Sterling Michael Gray, Austin, TX (US)

(73) Assignee: AECOM Technical Services, Inc., Austin, TX (US)

( * ) Notice: Subject to any disclaimer, the term of this patent is extended or adjusted under 35 U.S.C. 154(b) by 0 days. days.

(21) Appl. No.: 15/485,904

(22) Filed: Apr. 12, 2017

(65) Prior Publication Data

US 2017/0291137 A1 Oct. 12, 2017

Related U.S. Application Data

(60) Provisional application No. 62/321,274, filed on Apr. 12, 2016.

(51) Int. Cl.
*B01D 53/50* (2006.01)
*B01D 53/80* (2006.01)
*B02C 17/04* (2006.01)

(52) U.S. Cl.
CPC ........... *B01D 53/501* (2013.01); *B01D 53/80* (2013.01); *B02C 17/04* (2013.01);
(Continued)

(58) Field of Classification Search
CPC .................. B01D 53/501; B01D 53/80; B01D 2251/606; B01D 2251/404; B01D 2257/302; B01D 53/502; B02C 17/04
See application file for complete search history.

(56) References Cited

U.S. PATENT DOCUMENTS 5,635,149 A * 6/1997 Klingspor ............ B01D 53/501
423/243.08
5,820,831 A * 10/1998 Bresowar ............. B01D 53/501
422/170

(Continued)

FOREIGN PATENT DOCUMENTS

CN 1162204 C * 8/2004 ........... B01D 53/502
EP 0 777 519 B1 * 9/1999 ............ B01D 53/50

(Continued)

*Primary Examiner* — Timothy C Vanoy
(74) *Attorney, Agent, or Firm* — DuBois, Bryant & Campbell, LLP; William D. Wiese

(57) ABSTRACT

A flue gas desulfurization unit is converted from operating with lime or magnesium enhanced lime under inhibited oxidation into a unit that operates using limestone under inhibited oxidation conditions. A ball mill grinding unit may be installed to crush the limestone thereby producing a suspended slurry of fine limestone particles which is pumped to the reaction vessel. When installed, the ball mill may be installed in the process immediately downstream of the existing slaking equipment. The suspended solution may be maintained at a pH in the range of 3.0 to 6.5, optimally at approximately 5.0 to increase the dissolution rate of the limestone reagent produced by the ball mill. The post-conversion process may also require the addition of organic acids and oxidation inhibitors to achieve better $SO_2$ removal from the flue gas.

13 Claims, 6 Drawing Sheets

(52) U.S. Cl.
 CPC .. *B01D 2251/404* (2013.01); *B01D 2251/606* (2013.01); *B01D 2257/302* (2013.01)

(56) References Cited

U.S. PATENT DOCUMENTS

2002/0168311 A1* 11/2002 Takashina ............ B01D 53/502
 423/243.08
2017/0007959 A1* 1/2017 Fukuda ................... F23J 15/003
2017/0050144 A1* 2/2017 Kamiyama ........... B01D 53/501

FOREIGN PATENT DOCUMENTS

| GB | 2363345 A | * | 12/2001 | ........... B01D 53/502 |
|----|-----------|---|---------|------------------------|
| JP | 57050526 A | * | 3/1982 | ............. B01D 53/34 |
| KR | 100364652 B1 | * | 2/2003 | ........... B01D 53/501 |

* cited by examiner

METHOD FOR CONVERTING LIME-BASED WET FLUE GAS DESULFURIZATION SYSTEMS TO LIMESTONE-BASED SYSTEMS

PRIORITY STATEMENT UNDER 35 U.S.C. § 119

The present U.S. Patent claims priority pursuant to 35 U.S.C. § 119(e) to U.S. Provisional Application Ser. No. 62/321,274, filed Apr. 12, 2016, in the name of James David Colley, entitled "METHOD FOR CONVERTING LIME-BASED WET FLUE GAS DESULFURIZATION SYSTEMS TO LIMESTONE-BASED SYSTEMS USING EXISTING EQUIPMENT," the disclosure of which is hereby incorporated by reference in its entirety.

BACKGROUND OF THE INVENTION

Industrial and utility boilers are used to burn fossil fuel for the purpose of generating heat and/or electricity. In the process of converting the fuel into energy, a waste gas stream of significant volume is generated. This waste gas stream may contain contaminants that must be removed before being emitted into the atmosphere, and these contaminants include, but are not limited to, sulfur dioxide ($SO_2$), carbon dioxide ($CO_2$), carbon monoxide (CO), and vapors of metal compounds such as mercury, selenium, arsenic, chromium, and the like. To accomplish removal of these contaminants, operators of such processes will install equipment to capture the contaminants and add reagents to react with them to form less harmful substances; one of these processes is wet flue gas desulfurization (FGD). Wet FGD systems typically have a slurry reactor/absorber section and a solids dewatering section.

In the absorber section, circulating slurry is sprayed into the absorber which neutralizes the acidic gasses produced by the coal-fired boiler with alkaline slurry or liquor of compounds such as lime, limestone, sodium hydroxide, magnesium hydroxide or sodium sulfite. When the alkaline slurry or liquor reacts with the major acid gas, $SO_2$, in the absorber, it is converted to sulfite, and a slurry rich in sulfite is produced. The slurry is collected in a reaction tank where additional alkaline reagent, such as lime, limestone, or sodium hydroxide, is added, and in the case of forced oxidation scrubbers, air is forced to bubble through the slurry oxidizing the sulfite to sulfate.

In the dewatering section, limestone forced oxidation (LSFO) scrubbers form calcium sulfate or gypsum ($CaSO_4 \cdot 2H_2O$) byproduct which may be dewatered, filtered and sold for beneficial use by others such as in the production of wallboard. Alternatively, limestone inhibited oxidation (LSIO) scrubbers may be used in which an inhibitor, such as emulsified sulfur, thiosulfate, or iodide, is added to the process to reduce the formation of sulfate so that a mixed product of calcium sulfite and calcium sulfate ($CaSO_3/CaSO_4 \cdot 1/2H_2O$) is formed as the byproduct.

One significant disadvantage of the process used in lime-based or magnesium-enhanced lime-based scrubbers is associated with the supply and supply logistics of the lime reagent, such as availability, shipping concerns, proximity of supply, and cost. Those issues have created a significant concern on the part of some owners and operators of lime-based scrubbers in the industry. This has motivated many owners and operators to convert lime-based scrubbers to limestone based scrubbers. However, while such a conversion may seem straightforward, it is not.

The equipment that is used in a lime-based process differs from the equipment required for a limestone-based process, and converting from lime to limestone historically has been thought to require significant modification and replacement of the equipment by the owner/operator. There is a need, therefore, for a method of converting lime-based scrubbers to limestone-based scrubbers by maximizing the reuse of the existing equipment in the lime-based process, adding a limited amount of additional equipment, and operating the converted unit in a manner that is unique to currently operating limestone units.

SUMMARY OF THE INVENTION

Systems and methods are provided for conversion of lime-based wet flue gas desulfurization systems to limestone-based systems. These types of systems and methods are often associated with processes that combust fuels to generate heat and/or electricity. Embodiments of the invention involve operating the resulting limestone-based system using equipment that was originally intended for a lime-based system, with cost effective equipment addition and operating changes. In one embodiment, the conversion is from lime-based to limestone inhibited oxidation (LSIO), and another embodiment involves a conversion from lime-based to limestone forced oxidation (LSFO).

More specifically, an FGD unit may be converted from operating with lime or magnesium enhanced lime under inhibited oxidation into a unit that operates using limestone under inhibited oxidation conditions. Depending on removal and grinding requirements, a ball mill grinding unit may be installed to crush the limestone thereby producing a suspended slurry of fine limestone particles which is pumped to the reaction vessel. The ball mill may be installed in the process immediately downstream of the existing slaking equipment or, if the slaking equipment is not capable of pre-crushing limestone, the ball mill may be a standalone ball mill grinding system.

To increase the dissolution rate of the limestone reagent produced by the ball mill, the suspended solution in the post-conversion unit may be maintained at a pH in the range of 3.0 to 6.5, optimally at approximately 5.0. Lowering the operating pH of the suspended solution increases the dissolution rate of limestone and allows less-finely-ground limestone to be used as a reagent. In addition, the post-conversion process may require the addition of organic acids to achieve better $SO_2$ removal from the flue gas. The organic acid additive is injected from a supply tank into the FGD process.

For those limestone-based processes operating in inhibited oxidation mode (LSIO), the addition of an inhibitor reduces oxidation of sulfite and helps reduce scaling and maintain reliable flue gas desulfurization system operation. An oxidation inhibitor is added via an injection system that would pump the oxidation inhibitor from a supply tank into the FGD process.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention pertains to the conversion of lime-based wet flue gas desulfurization systems to limestone-based systems. The configuration and use of the presently preferred embodiments are discussed in detail herein. It should be appreciated, however, that the present invention provides many applicable inventive concepts that can be embodied in a wide variety of contexts other than the conversion of lime-based wet flue gas systems. Accordingly, the specific embodiments discussed are merely illustrative of specific ways to make and use the invention, and do not limit the scope of the invention.

Embodiments of the invention are centered on converting lime-based scrubbers into limestone-based scrubbers for the advantages of eliminating dependence on supply of the lime reagent. However, while investigating the conversion, other additional unexpected benefits were discovered, such as improving the scrubber efficiency, improving dewatering and filtration of the FGD byproduct, and offering the users the option of achieving near-zero or zero liquid discharges from their facility.

However, one of the complexities in converting a lime-based system to a limestone-based system is that limestone reactivity is greatly influenced by particle size. Smaller particle size increases the total surface area of the limestone reactant. Grind size is determined by passing a slurry sample through progressively smaller sieves. A typical specification for grind size in first-generation scrubbers was 70 percent passage through a 200-mesh screen. However, scrubber designers, operators and chemists came to realize that this size was too coarse to promote good utilization. Nowadays, 90 percent or greater passage through a 325-mesh screen is more desirable.

A system and method are provided for conversion of lime-based wet flue gas desulfurization systems to limestone-based systems. These types of systems and methods are often associated with processes that combust fuels to generate heat and/or electricity. Embodiments of the invention involve operating the resulting limestone-based system using equipment that was originally intended for a lime-based system, with equipment addition and operating changes only added as necessary in an effort to keep the overall reagent conversion economics justifiable. In one embodiment, the conversion is from lime-based to limestone inhibited oxidation (LSIO), and another embodiment involves a conversion from lime-based to limestone forced oxidation (LSFO).

Figure 1:
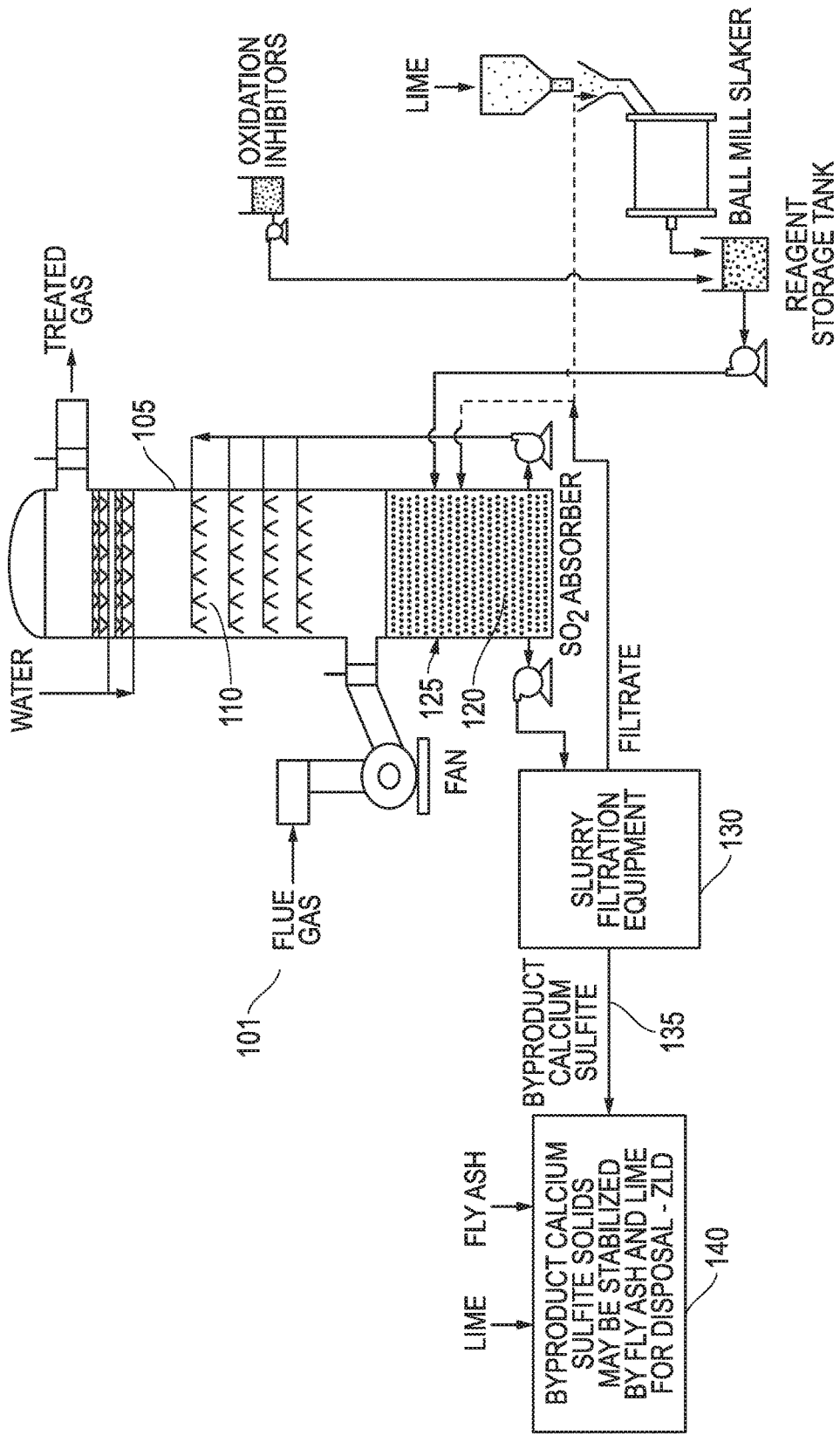
FIG. 1 is a diagram of an FGD unit operating with lime or magnesium enhanced lime (MEL) under inhibited oxidation (IO) conditions.

Referring now to FIG. 1, which shows a typical system in which the flue gas to be cleaned enters the bottom of a cylinder-like tower 105 and flows upward through a spray of lime slurry 110. The sulfur dioxide is absorbed into the spray and then precipitated as wet calcium sulfite 120 in the absorber 125. Although the configuration in FIG. 1 show the flue gas entering the bottom of the tower, those skilled in the art will appreciate that there are a variety of FGD systems known in the art and other configurations with alternate entry points may be utilized with various embodiments of the present invention. Likewise, while the tower is described and depicted as "cylinder-like" in FIG. 1 and the foregoing description, other shapes and/or configurations can be used with embodiments of the present invention.

In the absorber 125, $SO_2$ dissolves in the slurry and initiates a reaction with dissolved alkaline particles. The absorber slurry effluent, containing dissolved $SO_2$, is held in a reaction tank 130, which provides the retention time for finely ground lime particles in the slurry to dissolve and to complete the reaction with the dissolved $SO_2$. As a result of this reaction, sulfite crystallization occurs in the reaction tank, and alkalinity of the slurry is diminished. Fresh reagent is added to the reaction tank to compensate for this depletion and thereby maintain a desired level of alkalinity. The slurry is recirculated from the reaction tank into the absorber.

Reaction products from the reaction tank are pumped to the waste-handling equipment, where the sulfite can be filtered or stabilized through the addition of fly ash and lime for disposal 140. This type of wet scrubbing treats high-sulfur fuels and some low-sulfur fuels where high-efficiency sulfur dioxide removal is required. Wet scrubbing primarily uses magnesium-enhanced lime (containing 3-8% magnesium oxide) because it provides high alkalinity to increase $SO_2$ removal capacity and reduce scaling potential.

Figure 2:
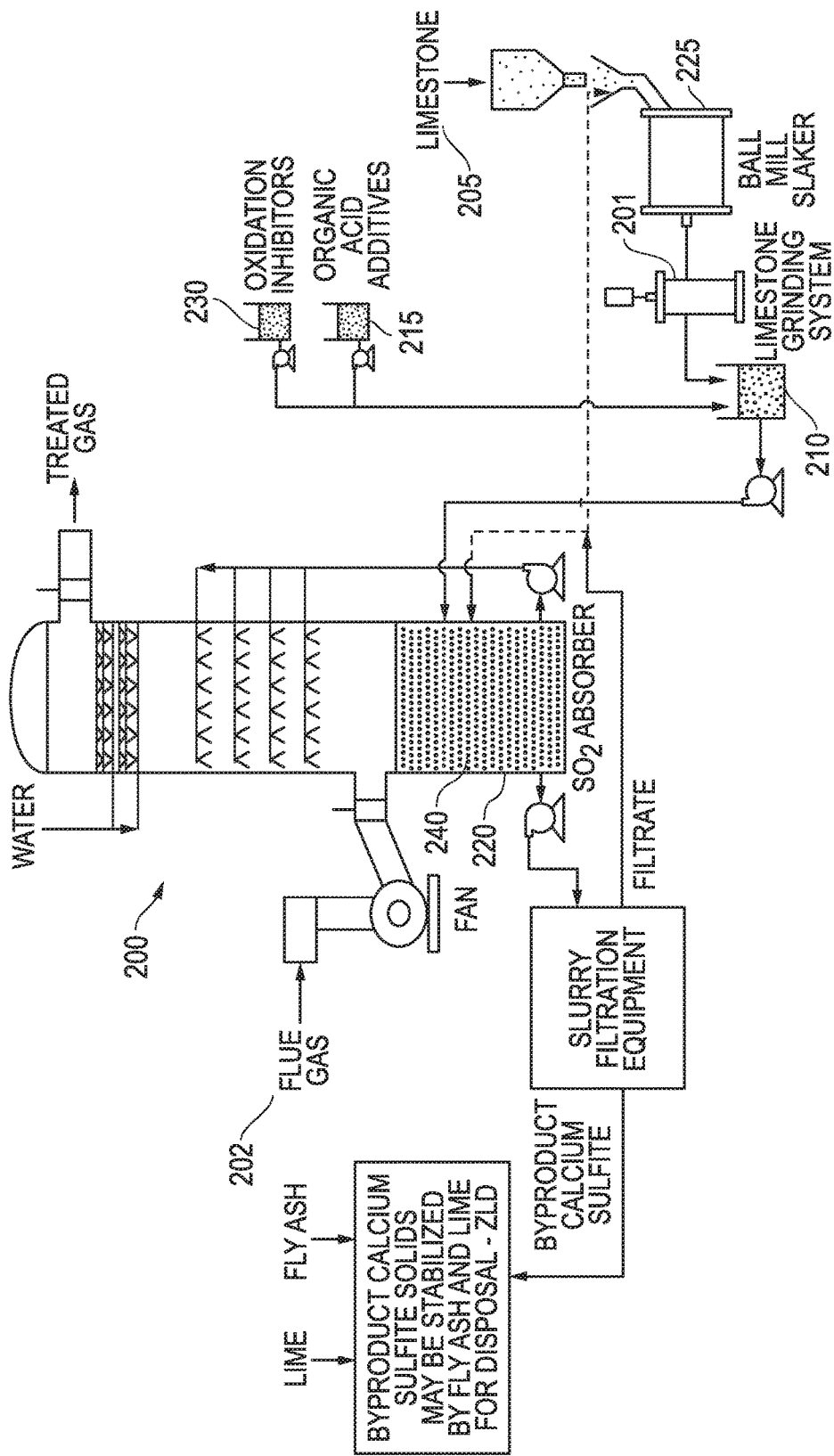
FIG. 2 is a diagram of an FGD unit that has been converted from operating with lime or magnesium enhanced lime (MEL) under inhibited oxidation (IO) conditions into one that operates using limestone under inhibited oxidation conditions (LSIO)

To convert from lime- to limestone-based systems, innovative equipment and operating changes are required. Referring now to FIG. 2 which depicts an FGD unit which has been converted from operating with lime or magnesium enhanced lime under inhibited oxidation into a unit 200 that operates using limestone under inhibited oxidation conditions, depending on removal and grinding requirements, one or more limestone grinding systems 201 may be installed to crush the limestone 205. This produces a suspended solution 210 of fine limestone particles (slurry), which is then pumped to the reaction vessel 220. In some embodiments, the limestone grinding system is a ball mill grinding system. However, rather than in installing a single, larger ball mill grinding system that would typically be used in a new limestone-based FGD unit, the ball mill grinding system may be used in conjunction with the vertical- or horizontal-style slaking equipment 225 that currently exists in the lime-based FGD system 200. In some embodiments, the limestone grinding system 201 may be installed in the process immediately downstream of the existing slaking equipment 225. Alternatively, if the slaking equipment 225 is not capable of pre-crushing limestone, the limestone grinding system 201 may be a standalone ball mill or other limestone grinding system.

To increase the dissolution rate of the limestone reagent produced by the limestone grinding system 201, the suspended solution 240 in the post-conversion unit may be maintained at a pH in the range of 3.0 to 6.5, optimally at approximately 5.0. Lowering the operating pH of the suspended solution 240 increases the dissolution rate of limestone 205 and allows less-finely-ground limestone 210 to be used as a reagent.

In some embodiments, the post-conversion process may require the addition of organic acids 215 to achieve better $SO_2$ removal from the flue gas 202. In these instances, an organic acids addition unit may be installed and the operating conditions may be modified to include the addition of organic acids. Examples of organic acids 215 suitable for buffering the pH of the system include such as formic, acetic, propanoic, butanoic, and analogs thereof; dibasic organic acids, such as adipic, malaeic, succinic, glutaric, and analogs thereof; and any water-based organic compounds of the glycol-based group of compounds such as ethylene glycol, propylene glycol, and analogs thereof; and any compounds based on glycolic acid compounds such as glycolic acid and any analogs thereof; is added to the process for the purpose of increasing removal of $SO_2$ from the gas stream. In some embodiments, such as that shown in FIG. 2, the organic acid additive injection equipment is installed so that the additive is injected from a supply tank into the suspended solution 210. Alternatively, the organic acid may be injected directly into the reaction vessel 220.

For those limestone-based processes operating in inhibited oxidation mode (LSIO), the addition of an oxidation inhibitor 230 reduces oxidation of sulfite. This helps maintain reliable flue gas desulfurization system operation, since as sulfite oxidation increases above 15 to 20% whereupon the rate of chemical scaling (calcium sulfate primarily) rises rapidly, adversely affecting system reliability. An oxidation inhibitor 230, such as, for example, sodium thiosulfate, emulsified sulfur, soluble iodide salts, or other suitable oxidation inhibiting agent, is added via an injection system that would pump the oxidation inhibitor 230 from a supply tank into the suspended solution 210. However, as with the organic acids, the oxidation inhibitors 230 may alternatively be injected directly into the reaction vessel 220.

Figure 3:
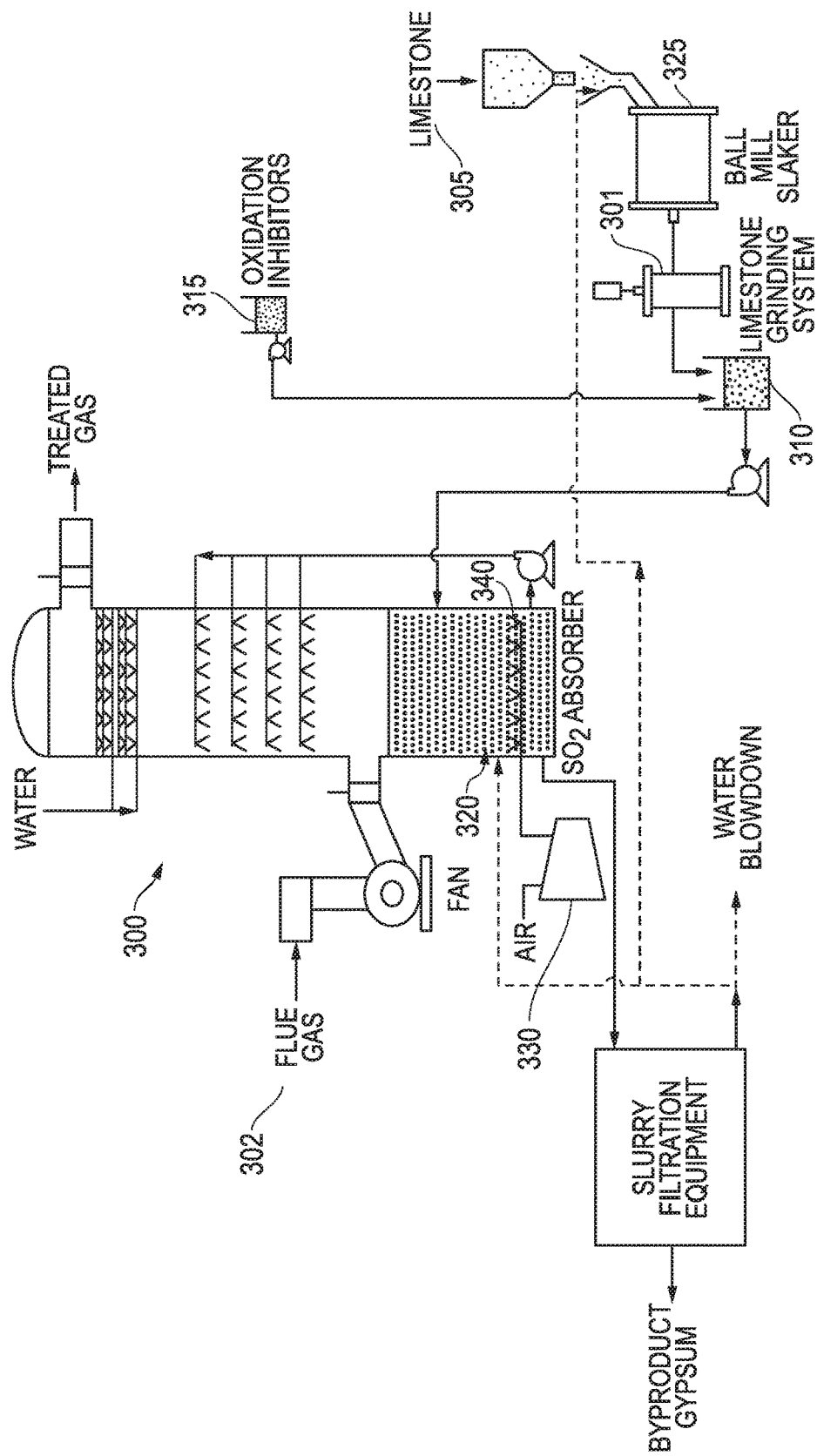
FIG. 3 is a diagram of an FGD unit that has been converted from operating with lime or magnesium enhanced lime (MEL) under inhibited oxidation (IO) conditions into one that operates using limestone under forced oxidation conditions (LSFO)

Referring now to FIG. 3 which depicts an FGD unit which has been converted from operating with lime or magnesium-enhanced lime under inhibited oxidation into a unit 300 that operates using limestone under forced oxidation conditions. The process in this embodiment is similar in many respects to the embodiment in which an FGD unit which has been converted from operating with lime or magnesium enhanced lime under inhibited oxidation into a unit 300 that operates using limestone under inhibited oxidation conditions. More specifically, one or more limestone grinding systems 301 may be installed to crush the limestone 305. This produces a suspended solution 310 of fine limestone particles (reagent slurry), which is then pumped to the reaction vessel 320. The limestone grinding system 301 of the present invention may be used in conjunction with the vertical- or horizontal-style slaking equipment 325 that currently exists in the lime-based FGD system 300. In some embodiments, the limestone grinding system 301 may be installed in the process immediately downstream of the existing slaking equipment 325. Alternatively, if the slaking equipment 325 is not capable of pre-crushing limestone, the limestone grinding system 301 may be, for example, a standalone ball mill grinding system.

An often critical factor regarding the choice of oxidized or non-oxidized byproduct involves the handling characteristics and commercial value of the solid. The calcium sulfite-sulfate hemihydrate in the reaction vessel 320 is a soft material that tends to retain water. It has little value as a chemical commodity. For this reason, many scrubbers are equipped with forced-air oxidation systems having an air supply 330 coupled with an oxidizer 340 to introduce additional oxygen to the scrubber slurry. A properly designed oxidation system will convert most if not all of the liquid sulfite ions to sulfate ions.

Here again, the post-conversion process may require the addition of organic acids 315 to achieve better $SO_2$ removal from the flue gas 302. In these instances, an organic acids addition unit may be installed and the operating conditions may be modified to include the addition of organic acids. Examples of organic acids 315 suitable for buffering the pH are consistent with those described above. The organic acid additive injection equipment is installed so that the additive is injected from a supply tank into either the suspended solution 310 or injected directly into the reaction vessel 320.

Figure 4:
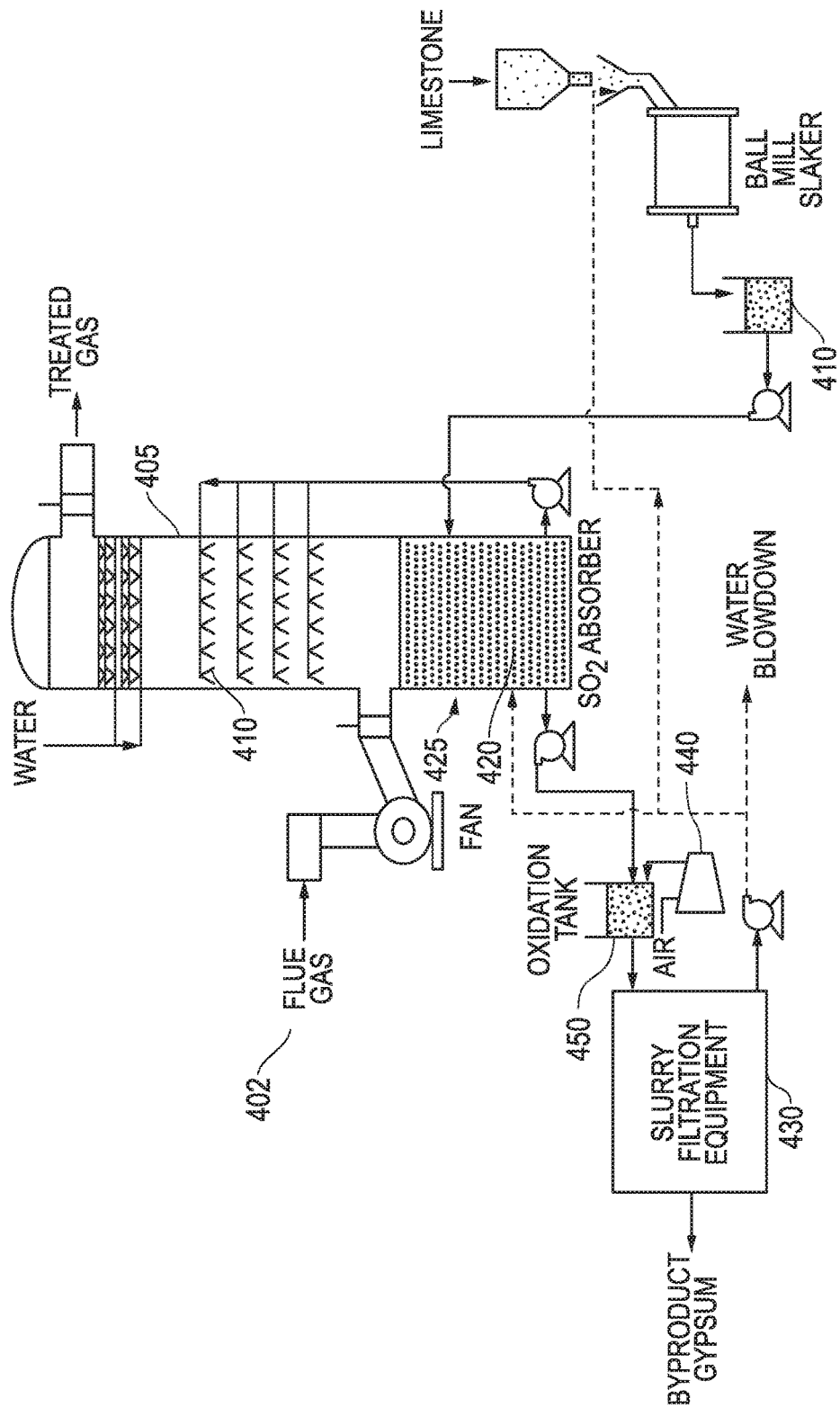
FIG. 4 is a diagram of an FGD unit operating with lime or magnesium enhanced lime (MEL) under forced oxidation (FO) conditions.

While the prior examples have expounded upon the conversion of a lime or mag-lime based inhibited oxidation system, there is also a need for the conversion of a lime or mag-lime forced oxidation system to a limestone-based system. A typical FGD unit operating with lime or magnesium enhanced lime under forced oxidation conditions is depicted in FIG. 4. In many respects, this system is similar to a system operating under inhibited oxidation conditions. The flue gas to be cleaned enters the absorber 405 and flows upward through a spray of lime slurry 410. The sulfur dioxide is absorbed into the spray and then precipitated as wet calcium sulfite 420 in the absorber 425.

In the absorber 425, $SO_2$ dissolves in the slurry and initiates a reaction with dissolved alkaline particles. The absorber slurry effluent, containing dissolved $SO_2$, is held in a reaction tank 425, which provides the retention time for finely ground lime particles in the slurry to dissolve and to complete the reaction with the dissolved $SO_2$. A forced-air oxidation system having an air supply 440 coupled with an oxidation tank 450 to introduce additional oxygen to the oxidation tank 450. This oxidation assists in converting most if not all of the liquid sulfite ions in the slurry to sulfate ions.

Figure 5:
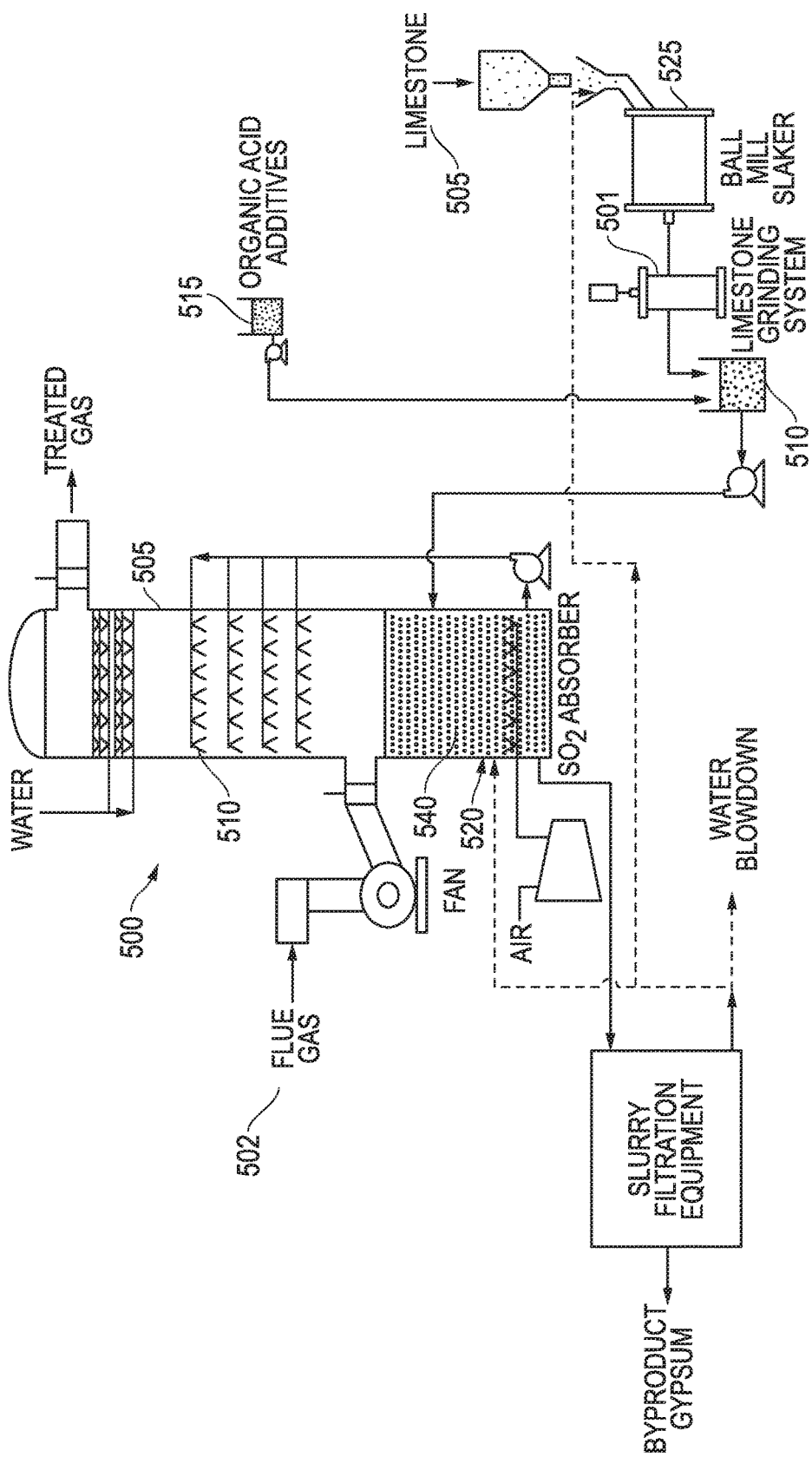
FIG. 5 is a diagram of an FGD unit that has been converted from operating with lime or magnesium enhanced lime (MEL) under forced oxidation (FO) conditions into one that operates using limestone under inhibited oxidation conditions (LSIO)

Referring now to FIG. 5 which depicts an FGD unit which has been converted from operating with lime or magnesium enhanced lime under forced oxidation into a unit 500 that operates using limestone under forced oxidation conditions. One or more limestone grinding systems 501 may be installed to crush the limestone 505 and produce a suspended solution 510 of fine limestone particles (reagent slurry), which is then pumped to the reaction vessel 520. In some embodiments, the limestone grinding systems 501 may be installed in the process immediately downstream of the existing slaking equipment 525. Alternatively, if the slaking equipment 525 is not capable of pre-crushing limestone, the limestone grinding systems 501 may be, for example, a standalone ball mill grinding system.

Once again, to increase the dissolution rate of the limestone reagent produced by the limestone grinding system 501, the suspended solution 540 in the post-conversion unit may be maintained at a pH in the range of 3.0 to 6.5, optimally at approximately 5.0. Lowering the operating pH of the suspended solution 540 increases the dissolution rate of limestone 505 and allows less-finely-ground limestone 510 to be used as a reagent.

In some embodiments, the post-conversion process may require the addition of organic acids 515 to achieve better $SO_2$ removal from the flue gas 502. In these instances, an organic acids addition unit may be installed and the operating conditions may be modified to include the addition of organic acids. Examples of organic acids 515 suitable for buffering the pH of the system have been previously described. The organic acid additive injection equipment is installed so that the additive is injected from a supply tank into the suspended solution 510. Alternatively, the organic acid may be injected directly into the reaction vessel 520.

Figure 6:
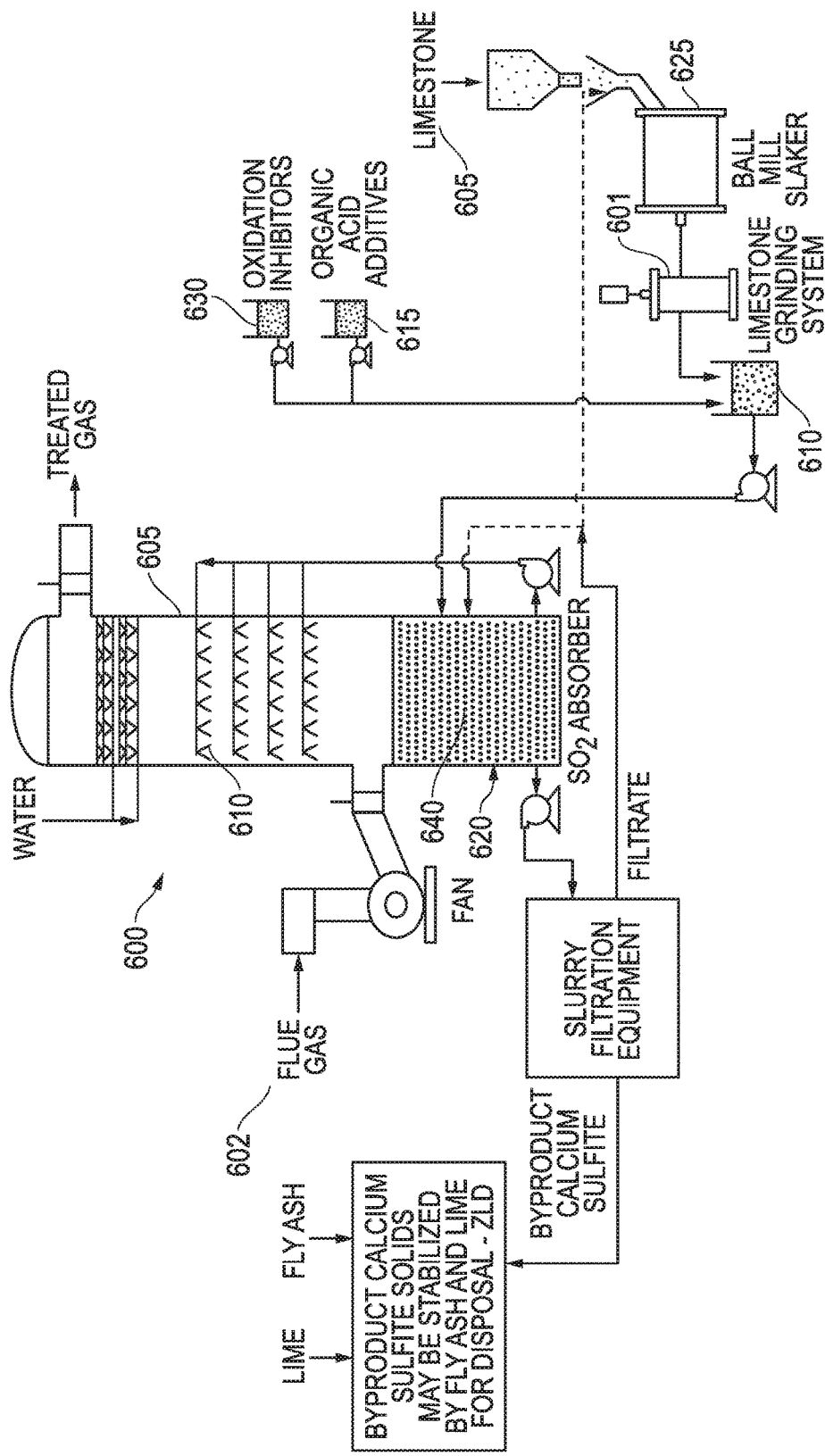
FIG. 6 is a diagram of an FGD unit that has been converted from operating with lime or magnesium enhanced lime (MEL) under forced oxidation (FO) conditions into one that operates using limestone under forced oxidation conditions (LSFO).

Referring now to FIG. 6 which depicts an FGD unit which has been converted from operating with lime or magnesium enhanced lime under forced oxidation into a unit 600 that operates using limestone under inhibited oxidation conditions. Depending on removal and grinding requirements, one or more limestone grinding systems 601 may be installed to crush the limestone 605. This produces a suspended solution 610 of fine limestone particles (reagent slurry), which is then pumped to the reaction vessel 620. The limestone grinding systems 601 of the present invention may be used in conjunction with the vertical- or horizontal-style slaking equipment 625 that currently exists in the lime-based FGD system 600. In some embodiments, the limestone grinding systems 601 may be installed in the process immediately downstream of the existing slaking equipment 625. Alternatively, if the slaking equipment 625 is not capable of pre-crushing limestone, the limestone grinding systems 601 may be a standalone grinding system.

Once again, to increase the dissolution rate of the limestone reagent produced by the one or more ball mills 601, the suspended solution 640 in the post-conversion unit may be maintained at a pH in the range of 3.0 to 6.5, optimally at approximately 5.0. Lowering the operating pH of the suspended solution 640 increases the dissolution rate of limestone 605 and allows less-finely-ground limestone 610 to be used as a reagent.

In some embodiments, the post-conversion process may require the addition of organic acids 615 to achieve better $SO_2$ removal from the flue gas 602. In these instances, an organic acids addition unit may be installed and the operating conditions may be modified to include the addition of organic acids. Examples of organic acids 615 suitable for buffering the pH of the system have been previously described. The organic acid additive injection equipment is installed so that the additive is injected from a supply tank into suspended solution 610 or, alternatively, the organic acid may be injected directly into the reaction vessel 620.

For those limestone-based processes operating in inhibited oxidation mode (LSIO), the addition of an inhibitor 630 reduces oxidation of sulfite. This helps maintain reliable flue gas desulfurization system operation, since as sulfite oxidation increases above 15 to 20% whereupon the rate of chemical scaling (calcium sulfate primarily) rises rapidly, adversely affecting system reliability. An oxidation inhibitor 630, such as, for example, sodium thiosulfate, emulsified sulfur, soluble iodide salts, or other suitable oxidation inhibiting agent, is added via an injection system that would pump the oxidation inhibitor 630 from a supply tank into the FGD process.

By way of example, a coal fired power plant in the midwestern United States has been operating for over 40 years utilizing the mag-lime FGD process for $SO_2$ control on two of its 400 MW units. The FGD systems are classic examples of lime scrubbing technology in that they utilize wet lime scrubbing augmented with a small fraction of magnesium in the makeup lime to supply the highly alkaline scrubbing slurry. In this case, each FGD system consists of two 50% capacity absorber modules capable of scrubbing out about 95% of the incoming $SO_2$ from the boiler. The FGD processes have operated with little change over the life of the plant.

Utilizing embodiments of the conversion process of the present invention, lime addition to one of systems was discontinued and operation using limestone and an organic buffer was begun. Since the conversion, the unit has run utilizing the limestone inhibited oxidation technology. The conversion has been very successful with good $SO_2$ removal performance. The new chemistry has proven to be reliable and stable, with significant cost savings resulting from use of limestone and an organic buffer. Chemical scaling conditions have been avoided through supplemental use of thiosulfate to help inhibit the formation of calcium sulfate, although other oxidation inhibitors discussed above would also have been suitable.

The reaction tank pH setpoint has been adjusted down to 5.8 which is lower than previous operation to provide good dissolution conditions for the medium-coarse limestone reagent. In addition, a surprising result has been the production of much larger calcium sulfite crystals as compared to the mag-lime based chemistry. This has made the final dewatering step more effective with a drier waste product being produced. The drier product is easier to handle and requires less fly ash and lime to stabilize, freeing up fly ash for beneficial use.

Furthermore, the possibility of another cost saving improvement to the new FGD process has been examined and that is the use of a single step for dewatering the sulfite solids. The success of the new FGD process chemistry and economics have been well established over a six month period and the plant is now working to convert the other mag-lime scrubber to the limestone inhibited oxidation technology.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for the conversion of flue gas desulfurization systems known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for converting an existing lime-based $SO_2$ scrubbing process for utility or industrial boilers into limestone-based inhibited oxidation $SO_2$ scrubbing process, comprising:
    adding a limestone grinding system to an existing lime-based $SO_2$ scrubbing system, wherein the limestone grinding system is located downstream from an existing slaking unit which pre-crushes the limestone prior to entering the limestone grinding system;
    grinding limestone in the limestone grinding system;
    depositing ground limestone from the limestone grinding system into slurry.

2. A method for converting an existing lime-based $SO_2$ scrubbing process for utility or industrial boilers into limestone-based inhibited oxidation $SO_2$ scrubbing process, comprising:
    adding a limestone grinding system to an existing lime-based $SO_2$ scrubbing system;
    grinding limestone in the limestone grinding system;
    depositing ground limestone from the limestone grinding system into slurry; and
    pumping the slurry into a flue gas desulfurization reaction vessel, further including addition of an organic acid to remove $SO_2$ from flue gas.

3. A method for converting an existing lime-based $SO_2$ scrubbing process for utility or industrial boilers into limestone-based inhibited oxidation $SO_2$ scrubbing process, comprising:
    adding a limestone grinding system to an existing lime-based $SO_2$ scrubbing system;
    grinding limestone in the limestone grinding system;
    depositing ground limestone from the limestone grinding system into slurry; and
    pumping the slurry into a flue gas desulfurization reaction vessel, further including addition of an organic acid selected from the group consisting of formic, acetic, glycolic, maleic, lactic, adipic, succinic and glutaric, to remove $SO_2$ from flue gas.

4. A method for converting an existing lime-based $SO_2$ scrubbing process for utility or industrial boilers into a limestone-based inhibited oxidation $SO_2$ scrubbing process, comprising:
    adding a limestone grinding system to an existing lime-based $SO_2$ scrubbing system;
    grinding limestone in the limestone grinding system;
    depositing ground limestone from the limestone grinding system into slurry; and
    pumping the slurry into a flue gas desulfurization reaction vessel, further including addition of an organic acid selected from the group consisting of a salt of one or more of formic, acetic, glycolic, maleic, lactic, adipic, succinic and glutaric to remove $SO_2$ from flue gas.

5. A method for converting an existing lime-based $SO_2$ scrubbing process for utility or industrial boilers into a limestone-based inhibited oxidation $SO_2$ scrubbing process, comprising:
    adding a limestone grinding system to an existing lime-based $SO_2$ scrubbing system;
    grinding limestone in the limestone grinding system;
    depositing ground limestone from the limestone grinding system into slurry; and
    pumping the slurry into a flue gas desulfurization reaction vessel, further including addition of an adibasic organic acid selected from the group consisting of adipic, malaeic, succinic and glutaric or an analog thereof to remove $SO_2$ from flue gas.

6. A method for converting an existing lime-based $SO_2$ scrubbing process for utility or industrial boilers into a limestone-based inhibited oxidation $SO_2$ scrubbing process, comprising:
    adding a limestone grinding system to an existing lime-based $SO_2$ scrubbing system;
    grinding limestone in the limestone grinding system;
    depositing ground limestone from the limestone grinding system into slurry; and
    pumping the slurry into a flue gas desulfurization reaction vessel, further including addition of an organic acid to remove $SO_2$ from flue gas, wherein the organic acid is a compound based on glycolic acid, or any analog thereof.

7. A method for converting an existing lime-based $SO_2$ scrubbing process for utility or industrial boilers into limestone-based inhibited oxidation $SO_2$ scrubbing process, comprising:
    adding a limestone grinding system to an existing lime-based $SO_2$ scrubbing system;
    grinding limestone in the limestone grinding system;
    depositing ground limestone from the limestone grinding system into slurry; and
    pumping the slurry into a flue gas desulfurization reaction vessel, further including addition of an oxidation inhibitor.

8. A method for converting an existing lime-based $SO_2$ scrubbing process for utility or industrial boilers into limestone-based inhibited oxidation $SO_2$ scrubbing process, comprising:
    adding a limestone grinding system to an existing lime-based $SO_2$ scrubbing system;
    grinding limestone in the limestone grinding system;
    depositing ground limestone from the limestone grinding system into slurry; and
    pumping the slurry into a flue gas desulfurization reaction vessel, further including addition of an oxidation inhibitor, wherein the oxidation inhibitor is one or more of sodium thiosulfate, emulsified sulfur or soluble iodide salts.

9. A method for converting an existing lime-based $SO_2$ scrubbing process for utility or industrial boilers into limestone-based forced oxidation $SO_2$ scrubbing process, comprising:
    adding a limestone grinding system to an existing lime-based $SO_2$ scrubbing system;
    grinding limestone in the limestone grinding system;
    depositing the ground limestone into a slurry; and
    pumping the slurry into a flue gas desulfurization reaction vessel, wherein the limestone grinding system is located downstream from an existing slaking unit which pre-crushes the limestone prior to entering the limestone grinding system.

10. A method for converting an existing lime-based $SO_2$ scrubbing process for utility or industrial boilers into limestone-based forced oxidation $SO_2$ scrubbing process, comprising:

adding a limestone grinding system to an existing lime-based SO$_2$ scrubbing system;
grinding limestone in the limestone grinding system;
depositing the ground limestone into a slurry; and
pumping the slurry into a flue gas desulfurization reaction vessel, further including addition of an organic acid to remove SO$_2$ from flue gas.

11. A method for converting an existing lime-based SO$_2$ scrubbing process for utility or industrial boilers into limestone-based inhibited oxidation SO$_2$ scrubbing process, comprising:
depositing ground limestone either directly or as a slurry into a flue gas desulfurization reaction vessel of an existing lime-based SO$_2$ scrubbing system; and
adding an organic acid to the flue gas desulfurization system to remove SO$_2$ from the flue gas.

12. A method for converting an existing lime-based SO$_2$ scrubbing process for utility or industrial boilers into limestone-based forced oxidation SO$_2$ scrubbing process, comprising:
depositing ground limestone either directly or as a slurry into a flue gas desulfurization reaction vessel of an existing lime-based SO$_2$ scrubbing system; and
adding an organic acid to the flue gas desulfurization system to remove SO$_2$ from the flue gas.

13. A method for converting an existing lime-based SO$_2$ scrubbing process for utility or industrial boilers into limestone-based inhibited oxidation SO$_2$ scrubbing process, comprising:
depositing ground limestone either directly or as a slurry into a flue gas desulfurization reaction vessel of an existing lime-based SO$_2$ scrubbing system,
further including addition of an oxidation inhibitor.

* * * * *